Feb. 9, 1926.
W. B. BRONANDER
1,571,929
DIE HOLDER
Filed May 18, 1922
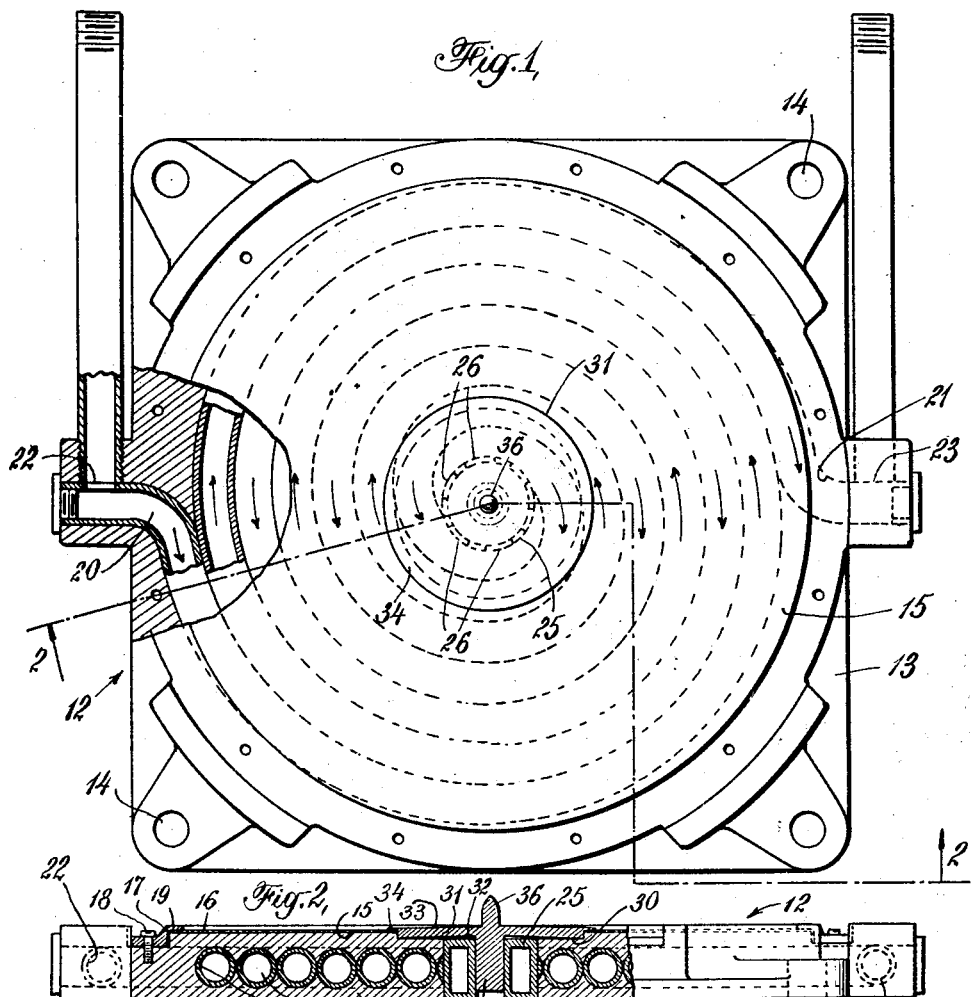
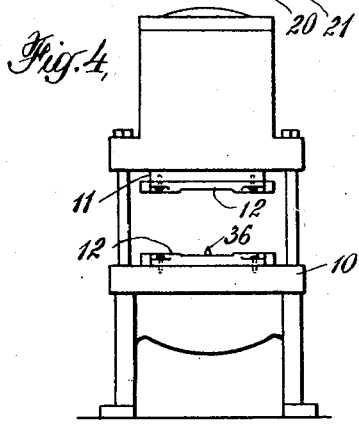
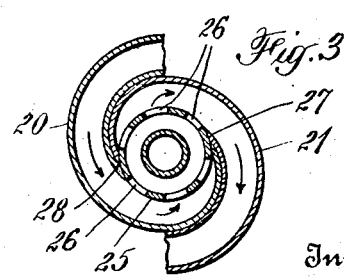
Inventor
Wilhelm B. Bronander
By his Attorney
E. W. Marshall Patented Feb. 9, 1926.

1,571,929

UNITED STATES PATENT OFFICE.

WILHELM B. BRONANDER, OF MONTCLAIR, NEW JERSEY.

DIE HOLDER.

Application filed May 18, 1922. Serial No. 561,798.

*To all whom it may concern:*

Be it known that I, WILHELM B. BRONANDER, a citizen of the United States, and a resident of Montclair, Essex County, and State of New Jersey, have invented certain new and useful Improvements in Die Holders, of which the following is a specification.

This invention relates to die holders for use in making phonograph records.

In making records of this character the material from which the record is made is pressed between dies while it is heated and plastic and the material is thereafter cooled and hardened while held under pressure between the dies. In order to produce perfect records it is necessary that the mass be kept comparatively soft by maintaining it at a predetermined temperature which must be uniform throughout the mass. This uniform temperature is maintained until the mass is compressed to the proper form between the dies. It is then cooled and hardened before the pressure is removed. This operation may be accelerated by artificial cooling but in order to be effective the cooling must also take place uniformly throughout the mass.

This invention has for its object to provide a simple and effective device for heating and cooling record dies during the process of their manufacture.

Another object of the invention is to provide a device by means of which the temperature of the material from which the records are made may be changed quickly but uniformly throughout the mass thereof.

Another object of the invention is to provide means in a die holder for facilitating the removal of the finished record therefrom.

Another object of the invention is to provide simple, practical and economical means for uniformly heating and cooling during the process of manufacture the material from which a phonograph record is made.

Further objects of the invention will appear from the following specification taken in connection with the drawings which form a part of this application and in which, Fig. 1 is a top plan view, partly broken away and partly in section, of a phonograph die holder constructed in accordance with the invention.

Fig. 2 is a view, partly in section and partly in elevation, taken substantially on line 2—2 of Fig. 1.

Fig. 3 is a detail sectional view illustrating the central portions of the spiral conduits for conducting the heating and cooling media and Fig. 4 is an elevational view of a die press in which the die holder may be used.

Like characters of reference designate corresponding parts throughout the drawings.

The die holder about to be described is used in a die press such as that illustrated in Fig. 4 and in this press the table is indicated at 10 and the head at 11.

The die or matrix holder 12 comprises a base 13 having counterbored openings 14 therein for the reception of bolts by means of which it may be secured to the table or head of the press.

The base 13 has formed thereon a matrix supporting surface 15 and the matrix 16 is clamped on the surface 15 by means of a ring 17. The ring 17, as shown in Fig. 2, is positioned in an annular recess in the base 13 and is secured thereto by screws 18. The ring 17, as shown at 19, projects above the matrix 16 a distance equal to one-half the thickness of the finished record and this distance therefore determines the thickness of the record.

As stated at the outset of the specification one of the objects of the invention is to provide means for uniformly heating and cooling the mass from which the record is formed. This means comprises a pair of inter-wound or juxtaposed spiral conduits 20 and 21. These conduits in the form of the invention shown consist of spiral tubes, one of the tubes 20 having an inlet port 22 disposed at one end thereof and located at one side of the die holder and the other conduit 21 having an outlet port 23 at its outer end disposed at the opposite side of the die holder. Fig. 1 clearly illustrates the manner in which one of these spirals is wound within the other and from this showing it will be clear that adjacent convolutions conduct the heating or cooling medium in opposite directions or in other words that the incoming medium in one conduit is positioned adjacent the outgoing medium in the adjacent coil of the other conduit.

An annular hollow ring 25 is secured centrally of the die holder and forms a central chamber communicating with the inner or central portions of both conduits. The outer wall of the member 25 has formed therein slots or openings 26 and the inner ends of the conduits 20 and 21 are flattened and secured as shown at 27 and 28 to the wall of the member 25. The medium passing through the spiral coils therefore, will be discharged from the incoming conduit 20 into the chamber formed in the annular member 25 through slots 26 and this medium will pass outwardly through other slots 26 into the outgoing spiral 21.

The parts just described may be manufactured in any desired or suitable manner. One method of making them consists of welding the inner ends of the spiral conduits to the ring 25 and thereafter casting the base 13 with the conduits and ring therein.

The central portion of the upper surface 15 of the die holder is recessed as shown at 30 and in this recess is positioned a dished disc 31 having a slightly concave lower surface 32 and a slightly convex upper surface 33, the upper surface of outer surface 33 projecting above the matrix supporting surface 15. The disc 31 also has formed thereon a laterally projecting thin annular flange 34 which rests on the outer surface of the matrix 16. As clearly illustrated in Fig. 2 a stud 35 is formed centrally on the disc 31 and is adapted to be positioned in the central opening in the annular ring 25. Opposite the stud 35 and extending outwardly from the upper surface or outer surface 33 of the disc is formed a pin 36 which will form the central opening in the record. The slight upward projection of the disc 31 above the upper surface of the matrix will form a centrally depressed portion in the record in which is positioned the label and in making the record by means of the apparatus described the label will be placed over the disc 31 and will be compressed into this opening through the process of manufacture.

The disc 31 is formed of resilient material and is compressed as pressure is exerted on the dies during the process of making the record. When, however, the pressure is released the disc will spring outwardly to the position shown in Fig. 2 and will carry with it the record produced thereby facilitating the removal of the record.

The structure above described is used in the following manner. It will be understood that a pair of die holders is used, one being secured to the table 10 of the press and the other to the head 11. If a double disc record is to be made a matrix is secured to each of the die holders and the material from which the record is to be made is placed over the table and matrix carried thereby. Steam is then admitted through the conduit 20 and passes to the central chamber formed by the annular member 25 and thence outwardly through the conduit 21. The outgoing heating medium will be heated by the incoming medium thereby maintaining a uniform temperature throughout the mass of the material which is rendered plastic by the heat. The two die holders are then brought together under pressure and the record is formed thereby. While still held under pressure the steam is shut off and a cooling medium such as cold water is introduced into the conduit 20 passing through this conduit and out through the conduit 21. This, in the manner before described, will quickly effect a uniform cooling of the mass of material and the record will therefore be cooled and hardened very quickly. The head of the press is then lifted from the table and the record will be sprung away from the matrix 16 by the resiliency of the disc 31 whereupon it may be lifted from the die holder.

Although one specific embodiment of the invention has been particularly shown and described, it will be understood that the invention is capable of modification and that changes in the construction and in the arrangement of the various cooperating parts may be made without departing from the spirit or scope of the invention as expressed in the following claims.

What I claim is:—

1. A die holder having a portion with a surface adapted to hold a matrix and conduits in said holder adjacent the matrix holding surface for conducting a heating or cooling medium, said conduits comprising a pair of interwound spirals communicating with each other at their central portions forming a single closed continuous passage, one of said conduits having an inlet at its outer end and the other conduit having an outlet at its outer end.

2. A die holder having a portion with a surface adapted to hold a matrix and conduits in said holder adjacent the matrix holding surface for conducting a heating or cooling medium, said conduits comprising a pair of interwound, intercommunicating spirals uniform in size throughout their length and forming a continuous passage, one of said conduits having an inlet at its outer end and the other conduit having an outlet at its outer end and forming a single closed continuous fluid passage.

3. A die holder having a portion with a surface adapted to hold a matrix, conduits in said holder adjacent the matrix holding surface for conducting a heating or cooling medium, said conduits comprising a pair of interwound spirals connected at their centers, means for admitting fluid to the outer end of one spiral and an outlet port at the outer end of the other spiral, said spiral conduits together forming a single closed continuous fluid passage, 4. A die holder having a surface for holding a matrix and a resilient disc supported centrally on said surface and having a slightly convex upper surface compressible by the pressure of the material on the die.

5. A die holder having a surface for holding a matrix, said surface having a central, recessed portion and a resilient dished disc disposed in said portion and having an outer convex surface.

6. A die holder having a surface for holding a matrix, said surface having a central, recessed portion and a resilient dished disc disposed in said portion and having an outer convex surface, said disc having a central outwardly projecting pin thereon.

7. A die holder having a surface for supporting a matrix, a hollow annular member disposed centrally in the holder and below said surface, and a pair of interwound spiral conduits, each communicating at its center with said annular member, one of said conduits having an inlet port at its outer end and the other conduit having an outlet port at its outer end.

8. A die holder having a surface for supporting a matrix, a hollow annular member disposed centrally in the holder and below said surface, a pair of interwound spiral conduits, each communicating at its center with said annular member, one of said conduits having an inlet port at its outer end and the other conduit having an outlet port at its outer end, and a dished disc having a central stud disposed in the annular member and having its outer surface projecting above the supporting surface of the die holder.

9. A die holder having a surface for supporting a matrix, a hollow annular member disposed centrally in the holder and below said surface, a pair of interwound spiral conduits, each communicating at its center with said annular member, one of said conduits having an inlet port at its outer end and the other conduit having an outlet port at its outer end, and a dished, resilient disc having a central stud disposed in the annular member and having its outer surface projecting above the supporting surface of the die holder.

10. A die holder having a surface for supporting a matrix, a hollow annular member disposed centrally in the holder and below said surface, a pair of interwound spiral conduits, each communicating at its center with said annular member, one of said conduits having an inlet port at its outer end and the other conduit having an outlet port at its outer end, a dished disc having a central stud disposed in the annular member and having its outer surface projecting above the supporting surface of the die holder, and having a centrally disposed pin projecting above the outer surface thereof.

11. A die holder having a surface for supporting a matrix, said surface having a central, recessed portion and a dished disc adapted to seat in said portion and having a flange adapted to rest on the matrix.

12. A die holder having a surface for supporting a matrix, said surface having a central, recessed portion and a resilient, dished disc adapted to seat in said portion and having a flange adapted to rest on the matrix.

13. A die holder having a surface for supporting a matrix, said surface having a central, recessed portion and a resilient, dished disc adapted to seat in said portion and having a flange adapted to rest on the matrix, said disc having a centrally disposed pin projecting laterally from its outer surface.

14. A metallic die holder having a matrix supply surface and a pair of interwound spiral tubes, inter-communicating at their inner ends embedded in the metal of the holder, said tubes together forming a single closed continuous fluid passage.

15. A metallic die holder having a matrix supply surface and a pair of interwound spiral tubes, and a central chamber communicating with both spirals, said tubes and central chamber being embedded in the metal of the die holder.

16. A die holder having a matrix supply surface, and a pair of interwound spiral tubes having their central portions intercommunicating, one spiral having an inlet port at its outer end and the other spiral having an outlet port at its outer end disposed opposite the inlet port of the first spiral said spiral tubes together forming a single closed continuous fluid passage.

17. A metallic die holder having a matrix supply surface and a pair of interwound spiral tubes, an annular chamber at the center of said spiral tubes, secured thereto and having communication therewith, said spirals and said tubes being embedded in the metal of the holder.

18. A die holder having a matrix supply surface, and a pair of interwound spiral tubular members below said surface, having intercommunicating central portions, one member having an inlet port at its outer end and the other having an outlet port at its outer end, said ports being disposed in alinement with each other, said spiral tubes together forming a single closed continuous fluid passage.

19. A die holder having means for holding a matrix a common central chamber and heating and cooling conduits comprising juxtaposed spiral conduits having their centers communicating with the common chamber said chamber and conduits together forming a single closed continuous fluid passage, the outer end of one of said conduits having an inlet for the admission of fluid and the outer end of the other conduit having an outlet for the emission of fluid.

20. A die holder having means for holding a matrix a common central chamber and heating and cooling conduits comprising juxtaposed conduits having their centers intercommunicating through said chamber, said chamber and conduits together forming a single closed continuous fluid passage, an inlet port for one conduit and an outlet port for the other conduit, said conduits being so arranged that the hottest portion of one conduit will be disposed side by side with the coolest portion of the other conduit.

In witness whereof, I have hereunto set my hand this 12th day of April, 1922.

WILHELM B. BRONANDER.